(12) United States Patent
Cheng

(10) Patent No.: US 12,429,650 B2
(45) Date of Patent: Sep. 30, 2025

(54) PHOTONIC CIRCUITRY HAVING STACKED OPTICAL RESONATORS

(71) Applicant: Taiwan Semiconductor Manufacturing Company, Ltd., Hsin-Chu (TW)

(72) Inventor: Wen-Hao Cheng, Hsinchu (TW)

(73) Assignee: TAIWAN SEMICONDUCTOR MANUACTURING COMPANY, LTD, Hsinchu (CN)

(*) Notice: Subject to any disclaimer, the term of this patent is extended or adjusted under 35 U.S.C. 154(b) by 185 days.

(21) Appl. No.: 18/188,102

(22) Filed: Mar. 22, 2023

(65) Prior Publication Data

US 2024/0004137 A1 Jan. 4, 2024

Related U.S. Application Data

(60) Provisional application No. 63/389,500, filed on Jul. 15, 2022, provisional application No. 63/357,436, filed on Jun. 30, 2022.

(51) Int. Cl.
*G02B 6/293* (2006.01)
(52) U.S. Cl.
CPC ................ *G02B 6/29338* (2013.01)
(58) Field of Classification Search
None
See application file for complete search history.

(56) References Cited

U.S. PATENT DOCUMENTS

| | | | |
|---|---|---|---|
| 10,338,416 B2* | 7/2019 | Liang | G02B 6/29341 |
| 10,372,014 B1 | 8/2019 | Vidrighin et al. | |
| 10,649,307 B2 | 5/2020 | Vernon et al. | |
| 11,003,046 B2 | 5/2021 | Liscidini et al. | |
| 2017/0017039 A1* | 1/2017 | Tu | G02B 6/12002 |
| 2021/0156687 A1* | 5/2021 | Paniccia | G01C 19/66 |
| 2022/0076155 A1 | 3/2022 | MacFarlane et al. | |
| 2023/0393339 A1* | 12/2023 | Pawlak | G02B 6/4215 |

FOREIGN PATENT DOCUMENTS

| | | |
|---|---|---|
| CN | 110023802 A | 7/2019 |
| CN | 110361907 A | 10/2019 |
| CN | 111416277 B | 7/2021 |
| CN | 110312956 B | 8/2021 |
| CN | 114675466 A | 6/2022 |
| TW | 202147060 A | 12/2021 |

* cited by examiner

*Primary Examiner* — Chad H Smith
(74) *Attorney, Agent, or Firm* — HAYNES AND BOONE, LLP

(57) ABSTRACT

An optical device includes a first ring resonator positioned in a first plane, a first optical waveguide positioned in the first plane and configured to provide photons to the first ring resonator, a second ring resonator positioned in a second plane that is below the first plane, and a second optical waveguide positioned in the second plane. The second optical waveguide is configured to receive photons escaping from the second ring resonator.

20 Claims, 13 Drawing Sheets

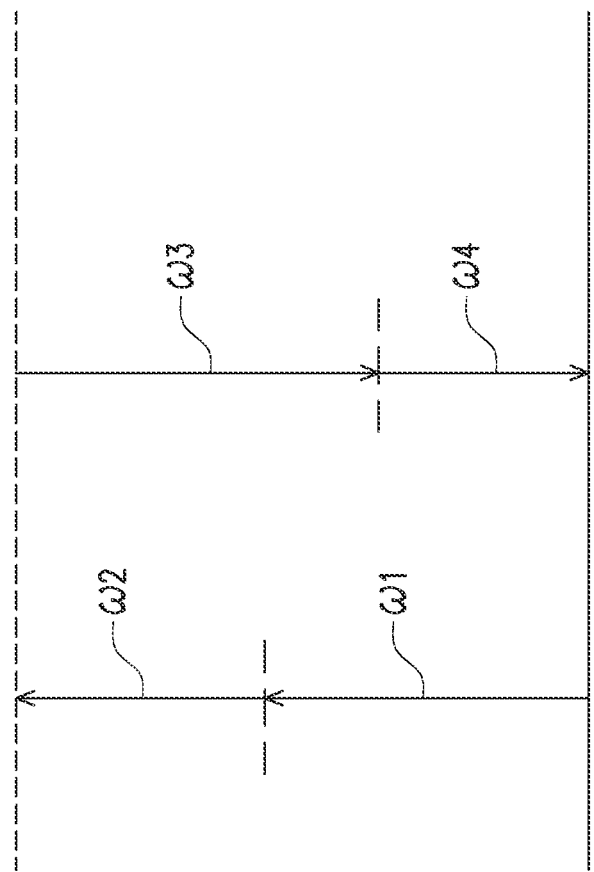

PHOTONIC CIRCUITRY HAVING STACKED OPTICAL RESONATORS

PRIORITY

This application claims the benefits of U.S. Prov. App. Ser. No. 63/357,436, filed Jun. 30, 2022, and U.S. Prov. App. Ser. No. 63/389,500, filed Jul. 15, 2022, the entire disclosures of which are incorporated herein by reference.

BACKGROUND

Optical resonators have found wide applications in classical optical communication systems. For example, optical resonators are very promising for providing high data rate, ultra-low power consumption, and small footprint (or size) for wavelength division multiplexing (WDM) technology including dense WDM (DWDM) technology in optical communication systems. Recently, optical resonators also found applications in photonic quantum technologies, such as quantum computation. For example, optical resonators may be implemented as source for providing squeezed light. Squeezed light refers to light in which the electric field strength for some phases has a quantum uncertainty (also referred to as noise) smaller than that of a coherent state. A wide range of applications can benefit from high quality sources of squeezed light. To fully exploit the potential of squeezed light in photonic quantum technologies, it is desired for the squeezed light source to be scalable, tunable, compatible with existing optical technology. Accordingly, there is a need to further improve optical resonator structures that provide high spectral purity and high optical power efficiency. Classical optical communication systems may also benefit from such improvement in optical resonator structures.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only except explicitly disclosed. In fact, the dimensions of the various features may be arbitrarily increased or reduced for clarity of discussion.

FIG. 2 shows a virtual level diagram of a spontaneous four-wave mixing process in a photon-pair source, according to an embodiment of the present disclosure.

DETAILED DESCRIPTION

Figure 1A:
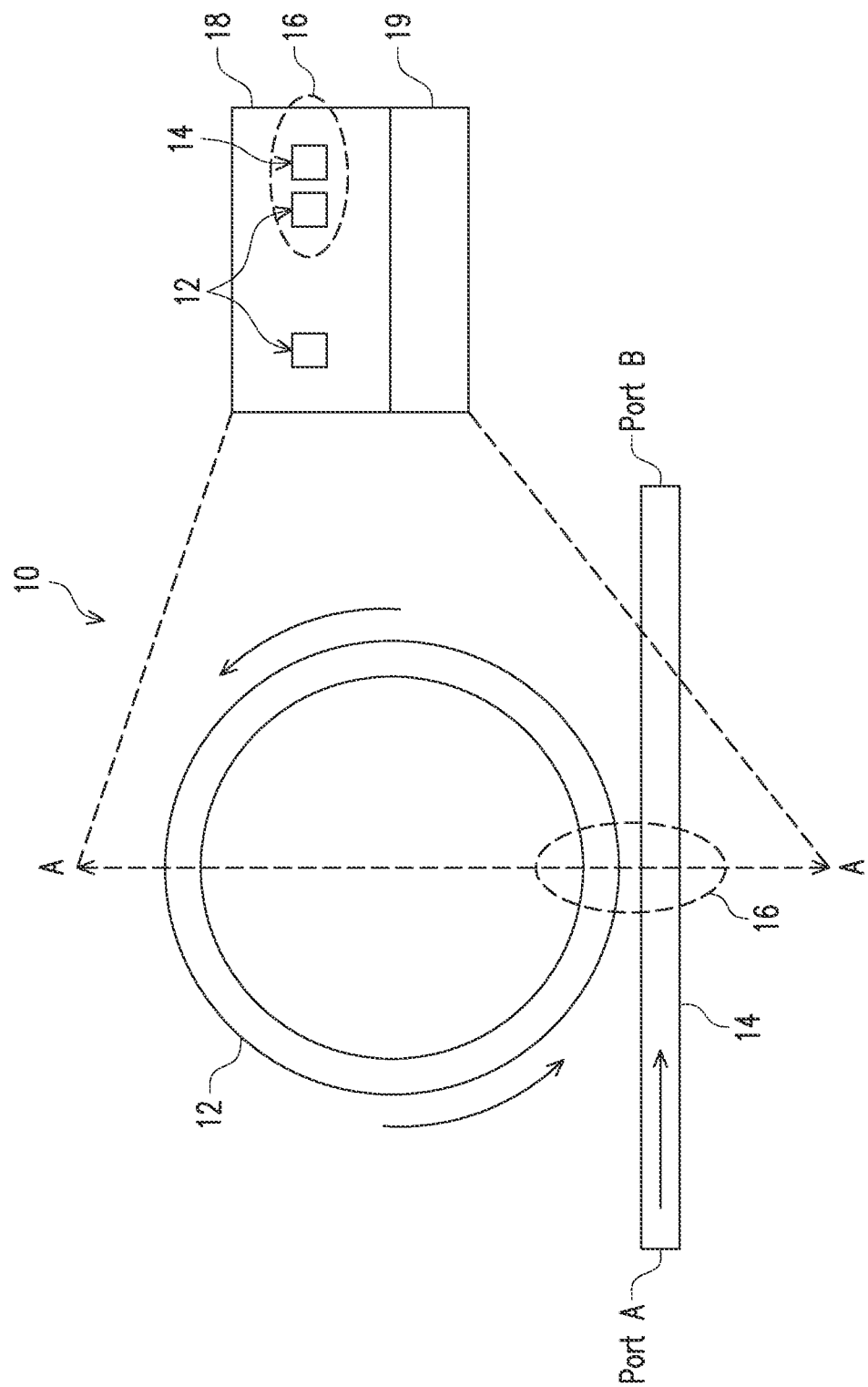
FIG. 1A illustrates a diagram of a photonic circuit with a ring resonator and a single rail optical waveguide, according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Further, when a number or a range of numbers is described with "about," "approximate," and the like, the term is intended to encompass numbers that are within a reasonable range considering variations that inherently arise during manufacturing as understood by one of ordinary skill in the art. For example, the number or range of numbers encompasses a reasonable range including the number described, such as within +/−10% of the number described, based on known manufacturing tolerances associated with manufacturing a feature having a characteristic associated with the number. For example, a material layer having a thickness of "about 5 nm" can encompass a dimension range from 4.5 nm to 5.5 nm where manufacturing tolerances associated with depositing the material layer are known to be +/−10% by one of ordinary skill in the art.

The present disclosure relates to photonic circuitry (or photonic structure), particularly photonic circuitry having stacked optical resonators. In some exemplary embodiments, the photonic circuitry having stacked optical resonators are implemented in generating squeezed light (also referred to as light in a squeezed state) for photonic quantum mechanics, such as quantum computation. The exemplary embodiments of the photonic circuitry provide photon sources with high spectral purity and high optical power efficiency. Meanwhile, the present disclosure is not limited thereto. Various optical communication systems or network technologies based on classical processing units also use both optical components and electronic circuits, and may implement the exemplary embodiments of the photonic circuitry for performance improvement. For example, the exemplary photonic circuitry having stacked optical resonators may be implemented in various optical communication systems, such as in wavelength division multiplexing (WDM) applications.

Quantum mechanics can have many advantages in encoding, transmission, and processing of information. For example, quantum key distribution may be used to achieve high secure communication. Quantum metrology can be used to achieve precision measurements that could not be achieved without using quantum mechanics. In particular, a quantum computer based on quantum mechanical effects can offer exponentially faster computation or higher computation throughput. Certain computational problems, such as the factoring of large numbers, cannot easily be solved using conventional computers due to the time required to complete the computation. It has, however, been shown that quantum computers can use non-classical algorithmic methods to provide efficient solutions to certain of these types of computational problems, among others.

The fundamental unit of quantum information in a quantum computer is called a quantum bit, or qubit. Quantum computers may utilize physical particles to represent or implement a quantum bit. In an electron approach, a "0" or a "1" may be represented by the spin of an electron, where the up or down spin can correspond to "0", "1", or a superposition of states in which the electron's spin is both up and down at the same time. Similarly, in a photonic approach to quantum computing, a "0" may be represented by the possibility of observing a single photon in a given path (or waveguide), whereas the potential for observing the same photon in a different path may represent a "1". Photons are excellent quantum information carriers because they combine high speed with long coherence times at room temperature. Accordingly, one realization in some quantum informatic processing systems is to utilize the quantum observables of a photon to encode information in qubits.

In such photonic-based quantum computing systems, one means for determining an interval in time in which the photon can be located in a particular spatial interval is the implementation of a "heralded" system. A heralded system consists of two photons with a known temporal coincidence window wherein the first photon is referred to as the "signal" photon and the second photon is referred to as the "idler" photon. To ensure that the (signal, idler) photon pair is coincident within a particular pre-determined and temporal coincidence window, particular known physical processes are employed, depending on the system. However, such heralded systems are often quite inefficient. Most architectures for photonic-based heralded quantum computing systems can only make use of a photon pair produced from a source a fraction of the time such a pair is actually produced. As such, the coupling efficiency or optical power efficiency of such quantum circuitry is severely compromised. Most architectures for photonic-based heralded quantum computing systems also suffer from limit quality factors in which spurious light are induced. As such, the spectral purity of such quantum circuitry is often compromised as well. What is desired then, is to increase the optical power efficiency and quality factor of a heralded system in photonic-based quantum circuitry.

To generate (signal, idler) photon pairs, photonic structures having an optical resonator, such as a ring resonator (or referred to as circular resonator), may be employed. A generic ring resonator consists of an optical waveguide that is looped back on itself, such that a resonance occurs when the optical path length of the resonator is exactly a whole number of wavelengths. Ring resonators therefore support multiple resonances, and the spacing between these resonances, the free spectral range (FSR), depends on the resonator length. By utilizing particular types or configurations of ring resonators in combination with certain photon sources, or couplings of photon sources to the ring resonators, (signal, idler) photon pairs with a differentiating attribute (e.g., wavelength) may be produced. Photonic-based quantum circuitry can then make use of such photon pairs in performing quantum computing.

A first particular physical process that enables heralded systems employs the use of the principle of "spontaneous parametric down conversion" (SPDC). The SPDC process may employ a nonlinear optical material, often a crystal, to effect time coincident generation of a signal photon and corresponding idler photon as products of a nonlinear optical process. SPDC occurs due to the non-zero second-order electric susceptibility term of the dielectric polarization for a non-linear material. SPDC utilizes a single incident photon under phase matching conditions, referred to here as the "pump" photon that is characterized by a frequency, $\omega_{pump}$. The pump photon with frequency, $\omega_{pump}$, is incident to a nonlinear optical material that can spontaneously convert the single pump photon energy into a (signal, idler) pair of temporal coincident photons with each having a frequency of $\omega_{signal}$ and $\omega_{idler}$ respectively wherein $\omega_{pump}=\omega_{signal}+\omega_{idler}$. Because the second-order non-linear effects are nearly instantaneous, the detection of one of the said created pair can herald the generation of the other.

A second particular physical process that enables heralded systems employs the use of the principle of "spontaneous four-wave mixing" (SFWM). The SFWM process may employ a structure that serves as a resonant cavity with a corresponding "quality factor" denoted by Q. SFWM occurs due to the non-zero third-order electric susceptibility term of the dielectric polarization of the cavity material. It is noted that cavities made of isotropic materials (one example is silica glass) have zero-valued second-order terms, thus the non-linear response of such materials is dominated by the non-zero third-order terms. One such resonant cavity structure is the "ring resonator." Within an appropriate structure or medium, SFWM can be regarded as the virtual absorption to two pump photons of frequency $\omega_{1pump}$ and $\omega_{2pump}$ with appropriate phase matching conditions resulting in the spontaneous creation of a (signal, idler) pair. Because the third-order non-linear effects are nearly instantaneous, the detection of one of the said created pair can herald the generation of the other. Due to the mixing relationship, the frequencies of the two pump photons and those of the resulting (signal, idler) pair are related as $\omega_{1pump}+\omega_{2pump}=\omega_{signal}+\omega_{idler}$.

In herald systems it is desirable that the signal and the idler photons have a property that is different between them that allows one to be distinguished from the other, and, further, to route one of the photons differently than the other. One example of such a property is to enable slight deviations in the phase matching criterion resulting in slight predictable deviations in wavelength of the spontaneously generated (signal, idler) pairs as compared to the wavelengths of the two pump photons. The predictable wavelength deviations of a (signal, idler) pair enables the use of SFWM to generate a signal photon at a first wavelength that is time coincident with a idler photon at a second wavelength, wherein the first wavelength of the signal photon differs from the second wavelength of the idler photon.

Figure 1B:
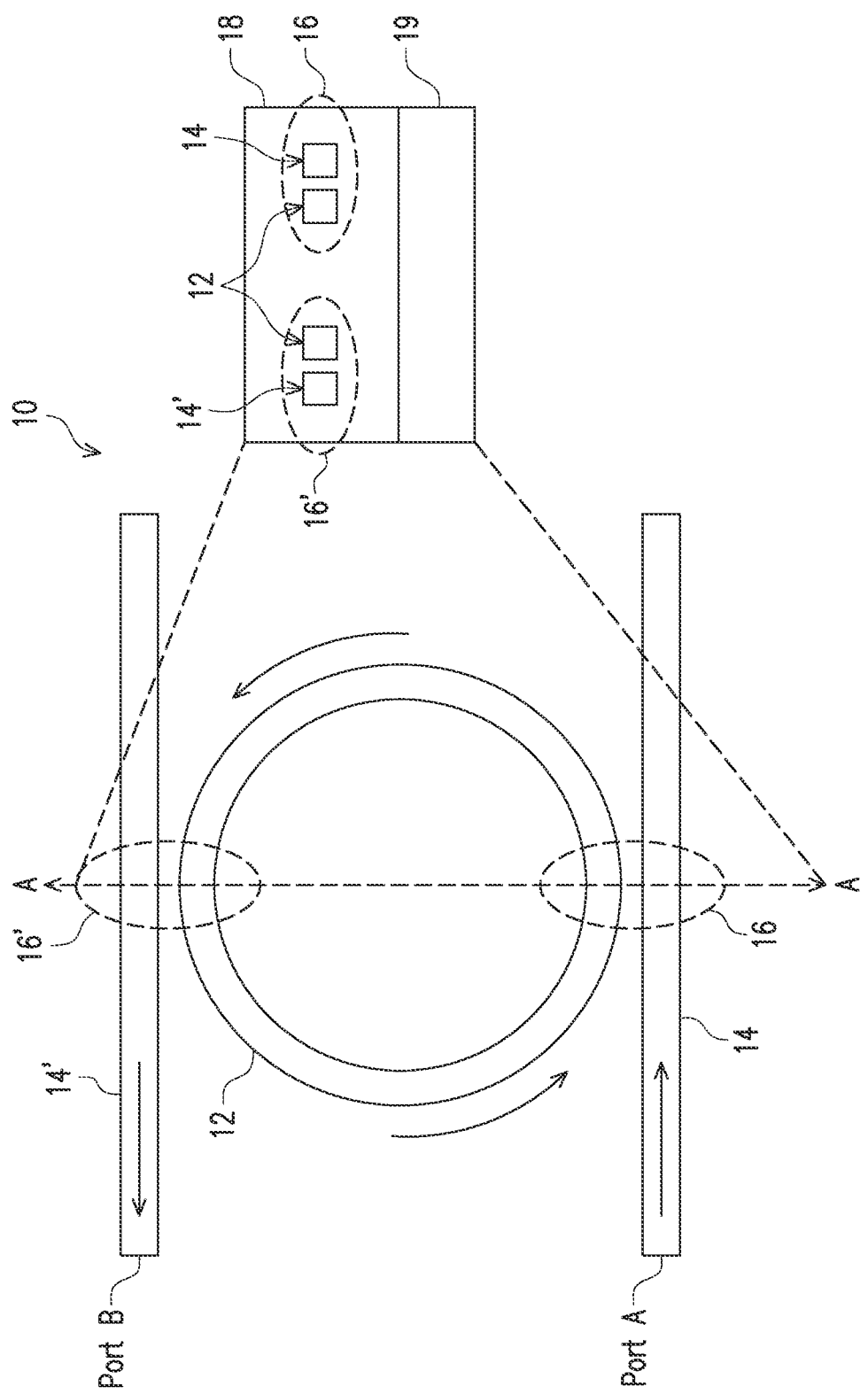
FIG. 1B illustrates a diagram of a photonic circuit with a ring resonator and dual rail optical waveguides, according to an embodiment of the present disclosure.

Referring to FIGS. 1A and 1B, some exemplary photonic circuits having a ring resonator that may be utilized as a photon pair source are illustrated. FIG. 1A illustrates a top view of a photonic circuit 10 that includes a ring resonator 12 and an optical waveguide (or referred to as bus optical waveguide) 14 in the form of a single rail. The ring resonator 12 can be considered as a type of optical waveguide in the form of a ring. A cross-sectional view of the photonic circuit 10 along a line A-A traveling through a center of the ring resonator 12 is also illustrated. The ring resonator 12 and the optical waveguide 14 each may include a non-linear optical material (such as silicon nitride or other suitable material including $LiNbO_3$, AlGaAs, InP, or AlN) surrounded by an oxide layer 18 (such as silicon dioxide) that is disposed over a semiconductor substrate 19 (such as a silicon substrate).

Further, the ring resonator and the optical waveguides may have different material compositions.

The ring resonator 12 may include a waveguide loop such that a resonance for photons having a certain wavelength may occur when the optical path length of the ring resonator is an integer number of the wavelength of the photons. The ring resonator 12 may support multiple resonances at multiple wavelengths that may meet the resonance condition. The spacing between these resonances in spectra may be referred to as the free spectral range (FSR) and may depend on the optical path length of the ring resonator. The ring resonator 12 may have a radius less than about a millimeter (mm)—such as about 5-12 micrometers (um)—and is also referred to as a micro-ring resonator. The terms "ring resonator" and "micro-ring resonator" are used interchangeable in the present disclosure.

Photon source(s) provides photons to the optical waveguide 14 though an input port, denoted as Port A. The photons propagate in the direction towards an output port of the optical waveguide 14, denoted as Port B. Photons traveling through one optical waveguide may be coupled into an adjacent optical waveguide. This phenomenon is referred to as evanescent coupling. As photons propagates through the optical waveguide 14, a fraction will be coupled into the ring resonator 12. To increase the fraction of photons coupled into the ring resonator 12 and accordingly to increase the coupling efficiency, the ring resonator 12 is closely positioned to the optical waveguide 14 to enhance the evanescent coupling. Thus, such evanescent coupling is also referred to as near-field coupling.

A region is indicated as near-field coupling region 16 that is representative of the portion of the photonic circuit 10 where near-field coupling occurs between the ring resonator 12 and the optical waveguide 14. A fraction of the photons coupled from the optical waveguide 14 propagate into the ring resonator 12, and a remaining fraction of the photons continue to propagate in the optical waveguide 14 and exit the optical waveguide 14 from Port B. Of the fraction of the photons that are coupled into the ring resonator 12, some further fraction undergoes a spontaneous physical process. For example, spontaneous four wave mixing (SFWM) or spontaneous parametric down-conversion (SPDC) process may occur in the ring resonator 12. In an SFWM process, two pump photons may be converted into a pair of daughter photons (e.g., signal and idler photons) in the nonlinear optical material. Due to energy conservation, the signal and idler photons generated may be at frequencies that are symmetrically distributed around the pump frequency. In general, due to such a spectral correlation, the heralded photons may be in a mixed state. The signal and idler photon generated within the ring resonator 12 may be coupled out of the ring resonator 12 and back to the optical waveguide 14 and exit towards the Port B, which occur in the near-field coupling region 16 at a certain coupling efficiency. The propagation directions of the photons in the optical waveguide 14 and the ring resonator 12 may be as shown in arrows in FIG. 1A.

FIG. 1B illustrates another embodiment of the photonic circuit 10, which further includes a second optical waveguide 14' in the form of a single rail. A cross-sectional view of the photonic circuit 10 along a line A—A traveling through a center of the ring resonator 12 is also illustrated. The ring resonator 12 and the optical waveguides 14 and 14' each may include a non-linear optical material (such as silicon nitride or other suitable material including $LiNbO_3$, AlGaAs, InP, or AlN) surrounded by an oxide layer 18 (such as silicon dioxide) that is disposed over a semiconductor substrate 19 (such as a silicon substrate). Further, the ring resonator and the optical waveguides may have different material compositions. The signal and idler photons generated within the ring resonator 12 may be coupled out of the ring resonator 12 to the second optical waveguide 14' and exit towards the port B, which occur in a second near-field coupling region 16' at a certain coupling efficiency. The propagation directions of the photons in the first optical waveguide 14, the ring resonator 12, and the second optical waveguide 14' may be as shown in arrows in FIG. 1B.

FIG. 2 is a virtual level diagram illustrating an example of a spontaneous four wave mixing (SFWM) process occurred in a photon-pair source. A pump photon at a first frequency ω1 and a pump photon at a second frequency ω2 may be mixed to generate a pair of photons with frequencies of ω3 and ω4, respectively. The two pump photons may have a same frequency or wavelength (i.e., ω1=ω2), such as provided by a single photon source. The two pump photons may have different frequencies or wavelengths (i.e., ω1≠ω2), such as provided by two combined photon sources. Due to energy conservation, frequencies of ω3 and ω4 of generated pair of photons may be symmetrical with respect to the frequency of the pump photons in the spectrum (i.e., |ω3−ω1|=|ω1−ω4|). It is noted with respect to FIGS. 1A and 1B that what coupled to the Port A may be the output of a single source (i.e., Ω1=ω2) or two (or more) combined sources (i.e., ω1≠ω2).

Figure 3A:
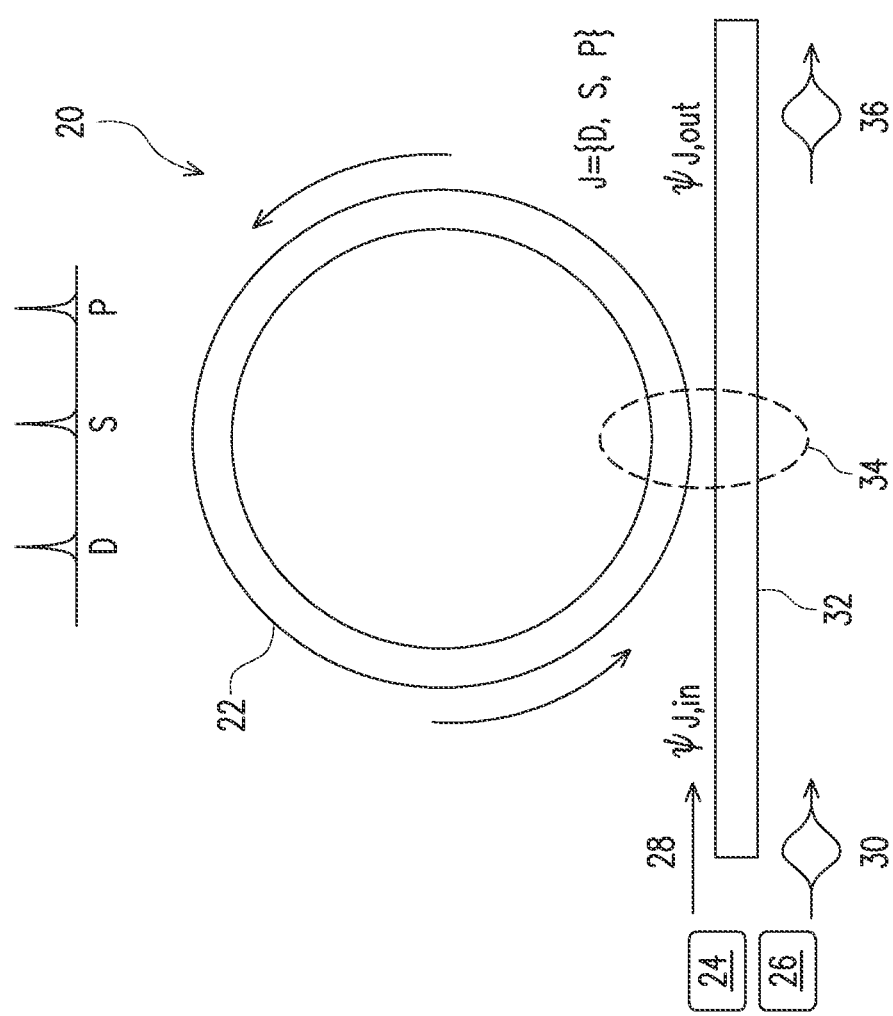
FIG. 3A illustrates a diagram of a photonic circuit with a ring resonator for generating squeezed light, according to an embodiment of the present disclosure.
Figure 3B:
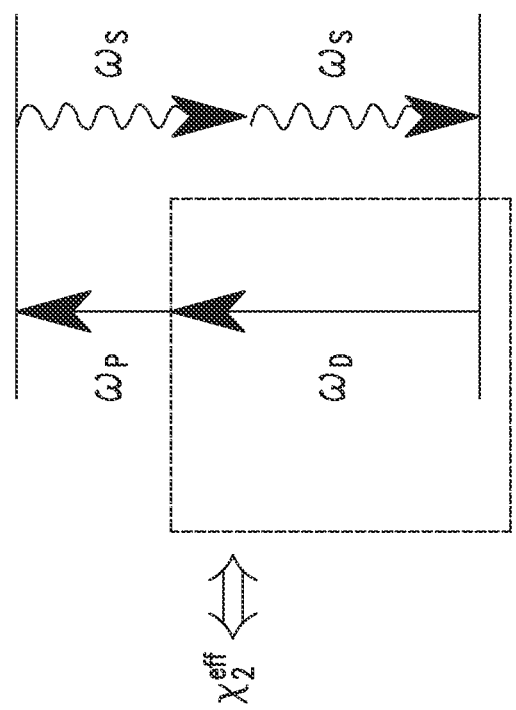
FIG. 3B shows a virtual level diagram of a dual-pumped spontaneous four-wave mixing process for generating squeezed light, according to an embodiment of the present disclosure.

With reference to FIGS. 3A and 3B, a squeezed light generating process by combining two photon sources to pump photons to the input port of a photon circuit is further examined. Particularly, FIG. 3A shows a photonic circuit 20 for generating squeezed light via an SFWM process by combining two photon sources to couple to the same port of a single rail optical waveguide, according to an embodiment. Combining two photon sources may be useful in particular applications for a plurality of reasons as will be understood by those of skill in the art. As a first fold, it may be useful to combine one source that is in the form of a pulsed laser and another source as an external pumping laser to produce a composite pumped pulsed source for use in the classical domain. As a second fold, it may be useful to combine two sources that generate photons of different frequencies as input to a single port to control physical processes such as SFWM that may occur within an optical resonator.

Squeezed light (also referred to light in a squeezed state) refers to light in which the electric field strength for some phases has a quantum uncertainty (also referred to as noise) smaller than that of a coherent state. A wide range of applications can benefit from high quality sources of squeezed light. For example, in metrology, using squeezed light allows certain optical sensors to overcome the shot noise limit and achieve sensitivities many times higher than possible with conventional light sources. In quantum communications, squeezed light can be used to distribute entanglement, thereby assisting cryptographic key distribution protocols. Squeezed light sources can also be used to deterministically generate massive highly entangled quantum states, enabling the construction of scalable quantum simulation and computation devices operating in the optical domain using a continuous variable encoding.

The photonic circuit 20 includes a ring resonator 22 characterized by a third-order nonlinear optical susceptibility. A drive light source 24 is in optical communication with the ring resonator 22 and configured to send a drive light beam 28 to the ring resonator 22 via an optical waveguide 32. The drive light beam 28 may include a continuous wave (CW) light beam. A pump light source 26 is in optical communication with the ring resonator 22 and configured to send a pump light beam 30 to the ring resonator 22 via the optical waveguide 32. The pump light beam 30 includes a pulsed light beam. The pump light beam 30 and the drive light beam 28 are configured to generate a signal light beam in a squeezed state of light via an SFWM process occurred in the ring resonator 22.

In some embodiments, the photonic circuit 20 can be constructed on an integrated nanophotonic platform. For example, the drive light source 24 (e.g., a CW semiconductor laser), the pump light source 26 (e.g., a pulsed semiconductor laser), the ring resonator 22, and the optical waveguide 32 can be fabricated on the same semiconductor substrate, thereby forming an integrated squeezed light source. In furtherance of some embodiments, the drive light source 24 and/or the pump light source 26 can include semiconductor lasers. In some embodiments, the drive light source 24 and/or the pump light source 26 can include lasers, light emitting diodes (LEDs), or any other appropriate type of light source. In some embodiments, the ring resonator 22 includes appropriate material that has a strong third order susceptibility. For example, the ring resonator 22 and the waveguide 32 each may include a non-linear optical material (such as silicon nitride or other suitable material including $LiNbO_3$, AlGaAs, InP, or AlN) surrounded by an oxide layer (such as silicon dioxide) that is disposed over a semiconductor substrate (such as a silicon substrate). Further, the ring resonator and the optical waveguides may have different material compositions.

In some embodiments, the power of the drive light beam 28 can be ten times or greater than the power of the pump light beam 30. In some embodiments, the power of the drive light beam 28 can be about 20 mW or greater. In one implementation, approximately 100 mW of drive power from the drive light beam 28 can be coupled to the ring resonator 22. Only a few mW or less of pulsed pump power from the pump light beam 30 can produce squeezed light having a squeezing factor (or squeeze level) of several dB. The generated squeezed state can be engineered to have single-temporal-mode nature by over-coupling the pulsed pump resonance (i.e., over-coupling between the pump light beam 30 and the ring resonator 22) via a couple region 34 based on Mach-Zehnder interferometer (MZI) and driving the four-wave mixing with a short pulse duration, without seriously compromising the efficiency. More modest over-coupling of the signal resonance (i.e., over-coupling between the signal light beam 36 and the ring resonator 22) can mitigate losses, thereby allowing nearly pure states to be generated. As used herein, pure states here refers to quantum mechanical states that are not entangled with other degrees of freedom (e.g., scattering modes).

In some embodiments, the drive light source 24 and/or the pump light source 26 are tunable so as to control the properties of the signal light beam 36. The magnitude and angle of the squeezing parameters can be determined by the product of the amplitudes of the drive light beam 28 and the pump light beam 30. Accordingly, the magnitude and angle of the squeezing can be controlled by modulating one or both of the input beams 28 and 30. In addition, the squeezing angle can be locked to the sum phase of the drive light beam 28 and the pump light beam 30. Furthermore, the squeezing factor can be controlled by the product of the powers of the two input beams 28 and 30. The squeezed output can therefore be calibrated against and controlled by the input powers and phases.

In some implementations, the output frequency of the drive light source 24 and/or the pump light source 26 can be tunable so as to change the squeezing factor of the signal light beam 36. In some implementations, the power of the drive light source 24 and/or the pump light source 26 can be tunable so as to change the squeezing factor of the signal light beam 36. In some implementations, the relative phase between the drive light source 24 and the pump light source 26 can be tunable so as to change the phase of the signal light beam 36.

The mechanism of squeezing underlying the photonic circuit 20 is naturally suited to engineering highly tunable devices with controllable temporal mode structure. More specifically, the wavelengths of the drive light beam 28 and the pump light beam 30 can be readily tunable. In addition, removal of unwanted pump light and suppression of unwanted spurious light can also be relatively easily achieved (e.g., via couplers). The resulting squeezed light source is therefore suited for quantum computing applications.

The ring resonator 22 can accommodate a number of resonant optical modes J, each of which is assigned a quantum-mechanical annihilation operators $b_J$. In the ring resonator 22, three optical modes are of interest here, i.e., the drive mode D, the signal mode S, and the pump mode P, with corresponding optical angular frequencies $\omega_D$, $\omega_S$, and $\omega_P$. These resonances may not be evenly spaced in their intrinsic configuration (e.g., due to material and modal dispersion). Accordingly, regarding quantum-mechanical annihilation operators $b_J$, $b_D$ represents the resonant optical mode of the drive light beam 28, $b_P$ represents the resonant optical mode of the pump light beam 30, and $b_S$ represents the resonant optical mode of the signal light beam 36.

FIG. 3B shows a virtual level diagram of the dual-pumped spontaneous four-wave mixing for generating squeezed light, according to an embodiment. In the presence of this effective second-order nonlinearity, a weaker coherent pump pulse in the P mode thereby produces photon pairs via parametric fluorescence into the S mode. Using a strong CW pump in conjunction with the intrinsic $\chi^3$ response can mediate an effective $\chi^2$ interaction (labelled as $\chi_2^{eff}$ in FIG. 3) in an integrated resonator. Particularly, to bring the desired parametric fluorescence process into resonance, a strong CW drive beam can be used to induce a nonlinear detuning via cross-phase modulation, pushing the D, S, and P resonances into an evenly spaced configuration in frequency. The pump mode P is driven by a sufficiently weak pump light beam 30, which only induces negligible self-phase modulation and cross-phase modulation. The signal mode S carries the generated squeezed light of interest. The third-order nonlinear optical response of the resonator material leads to an interaction Hamiltonian (representing the energy of the four-wave system) that contains a coefficient A is related to the resonator structure and the strength of the third-order optical nonlinearity of the resonator. For a ring resonator, the coefficient A can be written as $A \approx \hbar \omega_S v_g^2 \gamma_{NL}/2L$, where h is reduced Planck constant, $\omega_S$ is the frequency of the signal light beam 36, $v_g$ is the group velocity, L is the resonator length, and $\gamma_{NL}$ the waveguide nonlinear parameter. This interaction Hamiltonian is known to lead to a squeezed state of the signal S mode within the resonator via parametric fluorescence. This mode is coupled to the channel field (i.e., optical field within the waveguide 32), producing a propagating squeezed light output.

During squeezed light generation, a ring resonator may accommodate hundreds or even thousands of resonances. Out of these resonances (also referred to as auxiliary resonances or unwanted resonances), at least two processes are relevant to the performance in generating squeezed light.

The first one gives rise to unwanted spontaneous four-wave mixing, leading to the generation of spurious photons in the S mode. The second one gives rise to Bragg-scattering four-wave mixing, leading to an additional source of loss on the squeezed state generated in the S mode. Suppression of these unwanted photons is therefore beneficial to yield a highly-pure low-noise squeezed output (or referred to as a higher squeeze level, measured in dB).

Therefore, the ring resonator topology and dimensions can be carefully picked to generate squeezed light with high spectral purity and high optical power efficiency. The quality of the squeezed light output, in terms of contamination by unwanted spurious generated light and by excess anti-squeezing due to losses, can be optimized by several approaches. One approach is to add one or more extra ring resonators to the ring resonator structure. Adding extra ring resonators brings advantages in multi-folds compared to known squeezed light sources with a single ring resonator. In some embodiments, a second ring resonator introduces extra coupling so as to increase transition rate from source light beam to signal light beam. In some embodiments, a second ring resonator functions as an auxiliary coupler in suppressing unwanted photons. Generation of unwanted photons in the S mode via other spontaneous four-wave mixing from singly-pumped processes typically involves an auxiliary resonance other than the S, P or D modes. Such generation can thus be suppressed by constructing a device to corrupt the corresponding extra resonances involved, either by detuning them away from the energy-conserving condition, degrading their quality factors, or removing the unwanted resonance altogether. Multiple ring resonators may be spread in the same plane. Alternatively, multiple ring resonators can be stacked. Stacking ring resonators brings even stronger coupling between the ring resonators. Various embodiments of photonic circuitry with stacked ring resonators are illustrated below with reference to FIGS. 4-11.

Figure 4:
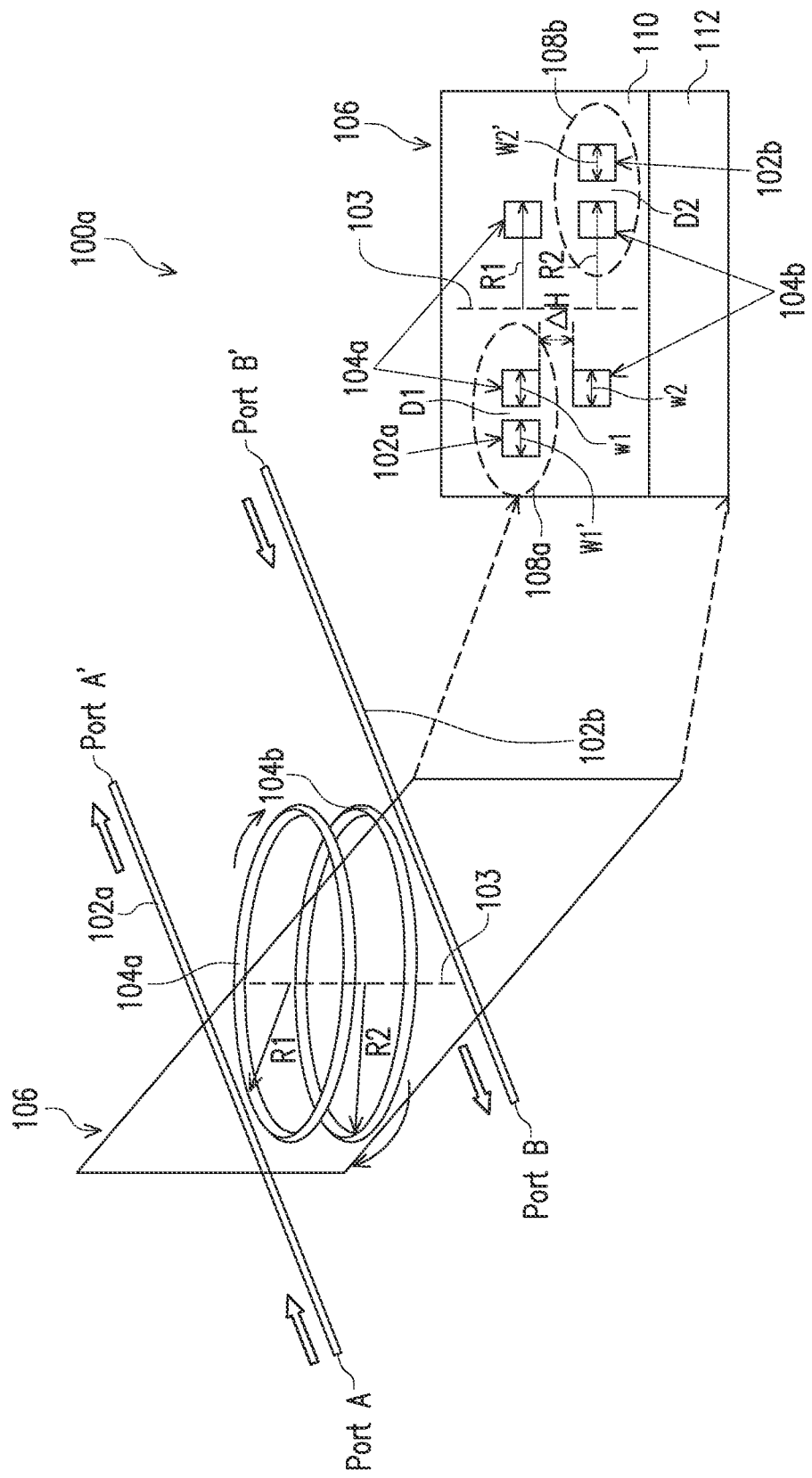
FIGS. 4, 5, 6, 7, 8, 9, 10, and 11 illustrate photonic circuits with multiple stacked ring resonators, according to some embodiments of the present disclosure.

FIG. 4 illustrates a perspective view and a cross-sectional view of a photonic circuit 100a. The photonic circuit 100a includes a first ring resonator 104a, a second ring resonator 104b, a first optical waveguide 102a, and a second optical waveguide 102b. The cross-sectional view is in a plane (or cross-sectional plane) 106 that cuts through centers of the first ring resonator 104a and the second ring resonator 104b and perpendicular to a substrate 112 above which the first ring resonator 104a and the second ring resonator 104b are disposed.

In the cross-sectional plane 106, the cross-sections of the first ring resonator 104a, the second ring resonator 104b, the first optical waveguide 102a, and the second optical waveguide 102b are depicted as squares but can also be other suitable shapes, such as rectangles, circles, or ovals. The first ring resonator 104a and the first optical waveguide 102a are positioned in a first horizontal plane. The second ring resonator 104b and the second optical waveguide 102b are positioned in a second horizontal plane. In the illustrated embodiment, the second horizontal plane is under the first horizontal plane. Alternatively, the second horizontal plane may be above the first horizontal plane.

In the illustrated embodiment, the centers of the ring resonators 104a and 104b are aligned in a top view of the photonic circuit 100a. State differently, a virtual line 103 connecting the centers of the ring resonators 104a and 104b is perpendicular to the horizontal planes in which the ring resonators 104a and 104b are respectively located. The ring resonators 104a and 104b are also referred to as concentric in a top view of the photonic circuit 100a. Alternatively, the centers of the ring resonators 104a and 104b may be offset from each other in a top view. State differently, a virtual line 103 connecting the centers of the ring resonators 104a and 104b may be tilted with respect to the horizontal planes in which the ring resonators 104a and 104b are respectively located.

The first ring resonator 104a, the second ring resonator 104b, the first optical waveguide 102a, and the second optical waveguide 102b each may include a non-linear optical material (such as silicon nitride or other suitable material including $LiNbO_3$, AlGaAs, InP, or AlN) surrounded by an oxide layer (such as silicon dioxide) 110 that is disposed over the semiconductor substrate (such as a silicon substrate) 112. Further, the ring resonators may have a first material composition, and the optical waveguides may have a second material composition different from the first material composition, which depends on device performance needs.

The first optical waveguide 102a is in the form of a single rail with two ports, namely, Port A and Port A'. The first optical waveguide 102a provides a path for source (incident) photons from a single photon source or combined photon sources as discussed above. The second optical waveguide 102b is in the form of a straight rail with two ports, namely Port B and Port B'. The straight rail of the second optical waveguide 102b is parallel to the straight rail of the first optical waveguide 102a. The second optical waveguide 102a provides a path for collecting and output signal (squeezed) photons. The stacked ring resonators 104a and 104b are positioned between the optical waveguides 102a and 102b in a top view of the the photonic circuit 100a.

The first ring resonator 104a has a radius R1 and a width W1. The second ring resonator 104b has a radius R2 and a width W2. The first optical waveguide 102a has a width W1' and a closest distance D1 from the circumference of the first ring resonator 104a. The first ring resonator 104a is suspended in a vertical distance $\Delta H$ above the second ring resonator 104b. The second optical waveguide 102b has a width W2' and a closest distance D2 from the circumference of the second ring resonator 102b. In some embodiments, R1 and R2 each range from about 5 um to about 12 um. In some embodiments, W1, W2, W1', and W2' each range from about 1 um to about 2 um. In some embodiments, D1 and D2 each range from about 100 nm to about 1 um. In some embodiments, the vertical distance $\Delta H$ between two ring resonators inside a pair is about 1 um to about 10 um. This range is not trivial. If $\Delta H$ is less about 1 um, the two ring resonators may be too close and over-couple the D and P resonances; if $\Delta H$ is larger than 10 um, the near-field coupling between the two ring resonators in a pair may become too weak. The above numeral values are exemplary, and the dimensions and intervals of the ring resonators 104a and 104b and the optical waveguides 102a and 102b can be variously formed in consideration of the wavelength of the incident light and the desired squeeze level.

In the illustrated embodiment, the ring resonators 104a and 104b are identical (R1=R2 and W1=W2), such that the circumferences of the two ring resonators are overlapped in a top view and the near-field coupling inside the pair is the strongest. The strong near-field coupling boosts the squeezing factor of the ring resonators. In furtherance, the optical waveguides 102a and 102b may have the same width (W1'=W2') and the same distance from respective ring resonators (D1=D2). Yet, the ring resonators 104a and 104b and the optical waveguides 102a and 102b each may be independently trimmed or tuned to have different resonances and coupling characteristics. For example, R1 may be larger than R2 (R1>R2) or smaller than R2 (R1<R2).

By having different R1 and R2, the two ring resonators in a pair may function as a main ring resonator and an auxiliary ring resonator. The main ring resonator (e.g., the first ring resonator 104a) induces a squeezed state in the S resonance, which has a frequency equal to the average frequency of the D and P modes. This squeezed state yields a squeezed light output propagating in the main ring resonator. The auxiliary ring resonator (e.g., the second ring resonator 104b) further tunes the main ring resonator to suppress unwanted four-wave mixing processes by coupling to appropriate resonances and corrupting their ability to generate spurious light in the S mode. The auxiliary ring resonator has a different free spectral range from the main ring resonator and is employed to selectively split, detune, and degrade the quality factor of the extra resonance involved, thereby suppressing the unwanted process while preserving the desired squeezing interaction. The auxiliary ring resonator is coupled to the main ring resonator through near-field coupling.

In furtherance, when R1 is different from R2, W1 may still equal W2 (W1=W2), larger than W2 (W1>W2), or smaller than W2 (W1<W2) depending on device performance needs. In one example, the photonic circuit 100a may have following non-limiting dimensional relationships: R1>R2, W1=W2, W1'>W2', and D1=D2, while other combinations are contemplated in the scope of the present disclosure.

The propagation directions of photons entering the photonic circuit 100a may be as shown in arrows in FIG. 4. Photon source(s) provides photons to the first optical waveguide 102a at Port A. The source (incident) photons propagate in the direction of Port A'. A region is indicated as coupling region 108a that is representative of the portion of the photonic circuit 100a where evanescent coupling (near-field coupling) occurs between the ring resonators 104a and the first optical waveguide 102a. As such evanescent coupling is often confined in a small region surrounding a point on a ring resonator that is in the closest distance to an optical waveguide, the coupling mechanism in FIG. 4 is also termed as near-field point coupling. Some fraction of the source photons coupled from the first optical waveguide 102a enters into the first ring resonator 104a. Of the fraction of photons that are coupled into the first ring resonators 104a, some further fraction undergoes a spontaneous physical process, such as a SFWM process, as they propagate through the first ring resonators 104a. A fraction of photons enters the second ring resonator 104b through near-field coupling. The second ring resonator 104b allows more fractions of photons going through an SFWM process, which increases photon conversion rate. Further, introducing extra coupling by adding an extra ring resonator mitigates intra-resonator losses that might degrade the achievable squeezing from scattering modes. Still further, extra resonance involved in unwanted four-wave mixing processes may be suppressed when the second ring resonator 104b function as an auxiliary ring resonator. The optical paths in the two ring resonators have the same directions. Of the total amount of photons circulating in the ring resonators 104a and 104b, a fraction having undergone a spontaneous physical process is coupled back into the optical waveguide 102 through the coupling region 108b and propagate towards Port B.

Research has revealed that by pumping more power into the same ring resonator structure, squeeze level can be further increased. In some embodiments, instead of having a single input port and a single output port, the photonic circuit 100a may include two input ports and two output ports. The extra input port and output port allow more optical power to be pumped into the photonic circuit 100a and further increase squeeze level. Particularly, the photonic circuit 100a may include Port A as a first input port coupled to one or more photon sources, Port B' as a second input port coupled to one or more photon sources, Port A' as a first output port for signal photons escaping from the first ring resonator 104a to exit, and Port B as a second output port for signal photons escaping from the second ring resonator 104b to exit.

The overall coupling mechanism in FIG. 4 is referred to as near-field-point-coupled in and near-field-point-coupled out. The extra ring resonator 104b provides more fractions of photons going through an SFWM process, which increases photon conversion rate. Further, as discussed above, introducing extra coupling by adding an extra ring resonator mitigates intra-resonator losses that might degrade the achievable squeezing from scattering modes.

Figure 5:
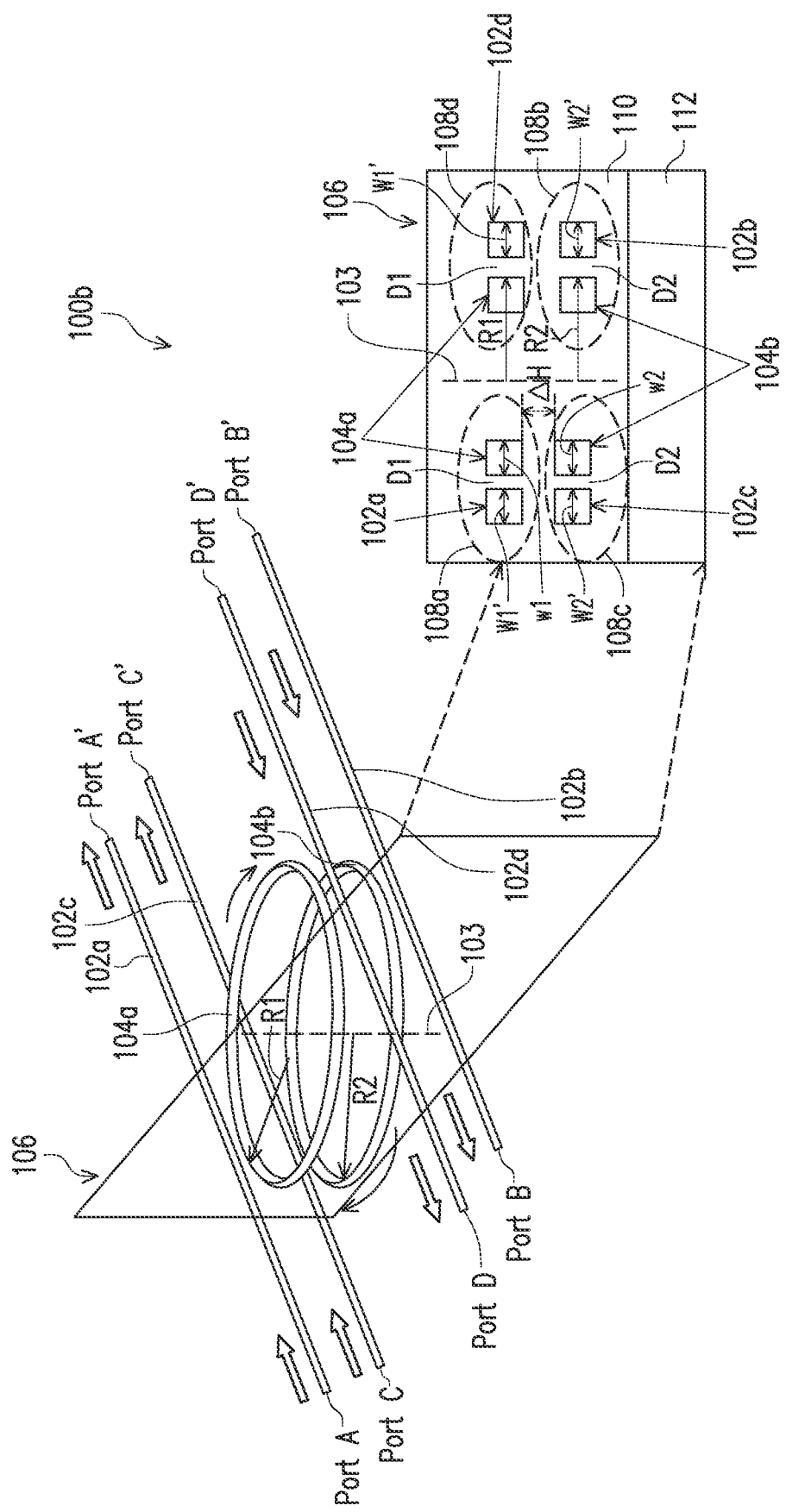

FIG. 5 illustrates a perspective view and a cross-sectional view of a photonic circuit 100b. The photonic circuit 100b includes a first ring resonator 104a, a second ring resonator 104b, a first optical waveguide 102a, and a second optical waveguide 102b. Since one skilled in the art would recognize that various aspects of the photonic circuit 100b are similar to the photonic circuit 100a illustrated in FIG. 4, and that various characteristics of the photonic circuit 100a would similarly apply to counterparts in the photonic circuit 100b, such similar aspects are not repeated below in the interest of conciseness. Different from the photonic circuit 100a, the photonic circuit 100b further includes a third optical waveguide 102c, and a fourth optical waveguide 102d. The extra optical waveguides provide extra input ports and output ports, allowing more optical power to be pumped in the photonic circuit 100b to further increase squeeze level.

The third optical waveguide 102c is in the form of a single rail with two ports, namely, Port C and Port C'. The fourth optical waveguide 102d is in the form of a single rail with two ports, Port D and Port D'. The third optical waveguide 102c is in the same horizontal plane with the second ring resonator 104b and the second optical waveguide 102b. The second ring resonator 104b is positioned between the second optical waveguide 102b and the third optical waveguide 102c. The fourth optical waveguide 102d is in the same horizontal plane with the first ring resonator 104a and the first optical waveguide 102a. The first ring resonator 104a is positioned between the first optical waveguide 102a and the fourth optical waveguide 102d. The first optical waveguide 102a and the fourth optical waveguide 102d may have the same dimensions (e.g., W1', D1). The second optical waveguide 102b and the third optical waveguide 102c may have the same dimensions (e.g., W2', D2).

The propagation directions of photons entering the photonic circuit 100b may be as shown in arrows in FIG. 5. In one implementation, Port A and Port C are input ports, Port B and Port D are output ports, and Port A', Port B', Port C' and Port D' remain floating. Photon sources provide photons to the first optical waveguide 102a at Port A and the third optical waveguide 102c at Port C. A region is indicated as coupling region 108a that is representative of the portion of the photonic circuit 100b where evanescent coupling (near-field coupling) occurs between the first ring resonators 104a and the first optical waveguide 102a. A region is indicated as coupling region 108c that is representative of the portion of the photonic circuit 100c where evanescent coupling (near-field coupling) occurs between the second ring resonators 104b and the third optical waveguide 102c. As such evanescent coupling is often confined in a small region surrounding a point on a ring resonator that is in the shortest distance to a respective optical waveguide, the coupling mechanism in FIG. 5 is also near-field point coupling. Some fraction of the source photons coupled from the first optical waveguide 102a enter into the first ring resonator 104a; some fraction of the source photons coupled from the third optical waveguide 102a enter into the second ring resonator 104b. Of the fractions of photons that are coupled into the ring resonators 104a and 104b, some further fraction undergoes a spontaneous physical process, such as a SFWM process, as they propagate through the respective ring resonators. A fraction of photons escaping from the first ring resonator 104a enters the second ring resonator 104b through near-field coupling; a fraction of photons escaping from the second ring resonator 104b enters the first ring resonator 104a through near-field coupling. Having an extra ring resonator in stack allows more fractions of photons going through an SFWM process, which increases photon conversion rate. Further, introducing extra coupling by adding an extra ring resonator mitigates intra-resonator losses that might degrade the achievable squeezing from scattering modes. Still further, extra resonance involved in unwanted four-wave mixing processes may be suppressed when the second ring resonator 104b function as an auxiliary ring resonator. The optical paths in the two ring resonators have the same directions. Of the total amount of photons circulating in the ring resonators 104a and 104b, a fraction having undergone a spontaneous physical process in the first ring resonator 104a is coupled back into the fourth optical waveguide 102d through the coupling region 108d and exit through Port D; a fraction having undergone a spontaneous physical process in the second ring resonator 104b is coupled back into the second optical waveguide 102b through the coupling region 108b and exit through Port B.

In another implementation, Port A, Port C, Port B', and Port D' are input ports, and Port A', Port C', Port B, Port D are output ports. Photon sources provide photons to the first optical waveguide 102a at Port A, the third optical waveguide 102c at Port C, the second optical waveguide 102b at Port B', and the fourth optical waveguide 102d at Port D'. A fraction of the photons having undergone a spontaneous physical process and escaped from the first ring resonator 104a is coupled back into the first optical waveguide 102a through the coupling region 108a and exit through Port A' and coupled back into the fourth optical waveguide 102d through the coupling region 108d and exit through Port D. A fraction of the photons having undergone a spontaneous physical process and escaped from the second ring resonator 104b is coupled back into the second optical waveguide 102b through the coupling region 108b and exit through Port B and coupled back into the third optical waveguide 102c through the coupling region 108c and exit through Port C'.

The overall coupling mechanism in FIG. 5 is referred to as near-field-point-coupled in and near-field-point-coupled out. The extra ring resonator 104b provides more fractions of photons going through an SFWM process, which increases photon conversion rate. Further, as discussed above, introducing over-coupling by adding an extra ring resonator mitigates intra-resonator losses that might degrade the achievable squeezing from scattering modes.

Figure 6:
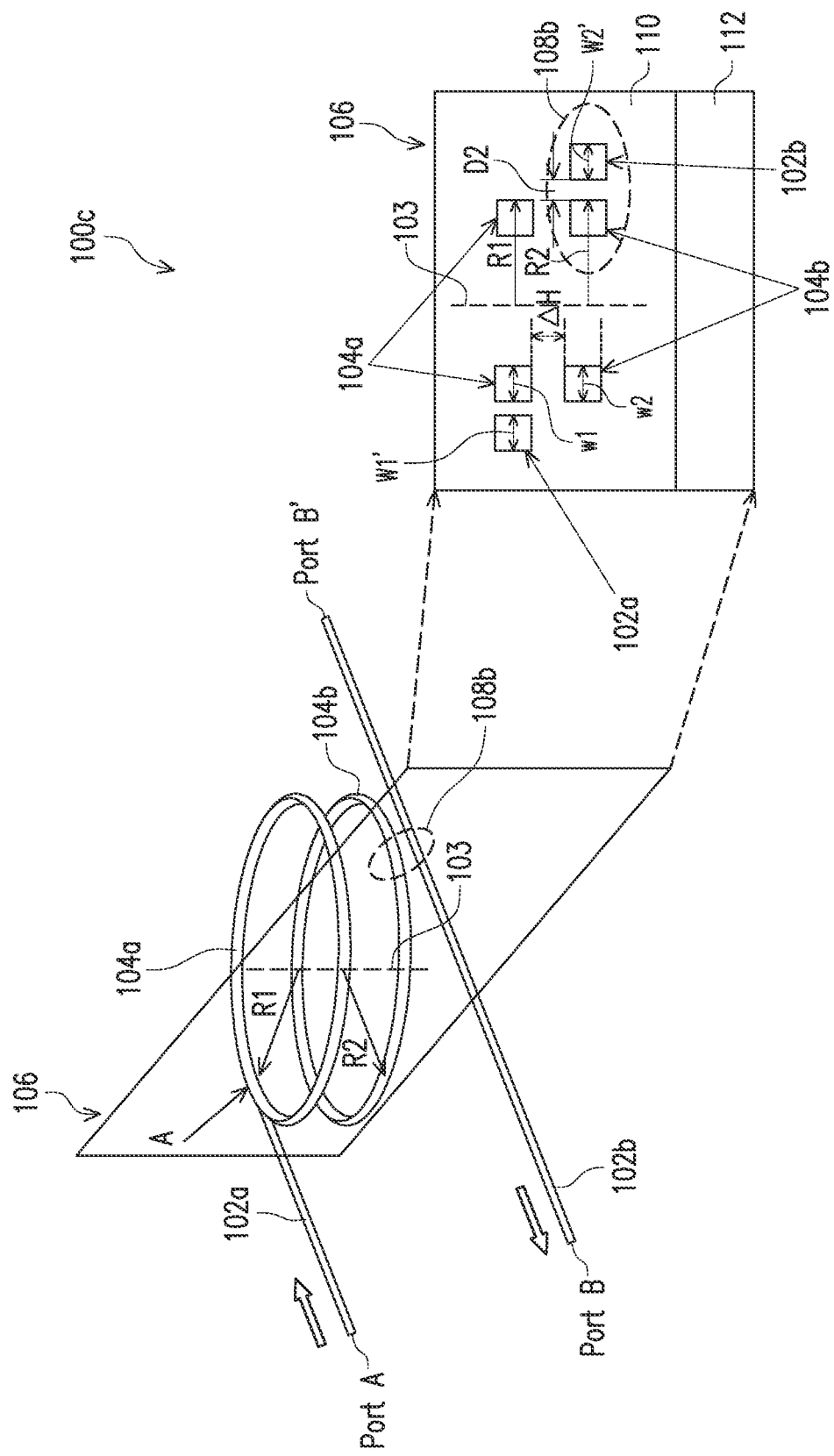

FIG. 6 illustrates a perspective view and a cross-sectional view of a photonic circuit 100c. The photonic circuit 100c includes a first ring resonator 104a, a second ring resonator 104b, a first optical waveguide 102a, and a second optical waveguide 102b. Since one skilled in the art would recognize that various aspects of the photonic circuit 100c are similar to the photonic circuit 100a illustrated in FIG. 4, and that various characteristics of the photonic circuit 100a would similarly apply to counterparts in the photonic circuit 100c, such similar aspects are not repeated below in the interest of conciseness. Yet, the optical waveguides 102a and 102b in the photonic circuit 100c have some differences from the counterparts in the photonic circuit 100a.

The first optical waveguide 102a has the form of a straight rail with an input port Port A. The straight rail is tangentially in contact with the circumference of the first ring resonator 104a at point A. That is, at point A the first optical waveguide 102a merges into the circumstance of the first ring resonator 104a. In the horizontal plane where the first ring resonator 104a resides, a virtual line traveling through point A and the center of the first ring resonator 104a is perpendicular to the straight rail of the first optical waveguide 102a.

The second optical waveguide 102b has the form of a straight rail with an output port Port B. The straight rail of the second optical waveguide 102b is parallel to the straight rail of the first optical waveguide 102a. The straight rail of the second optical waveguide 102b has a distance D2 from the circumference of the second ring resonator 104b to receive photons by near-field coupling through the coupling region 108b. The second optical waveguide 102b may not extend beyond edges of the ring resonators as its counterpart illustrated in FIG. 4. In some embodiments, the other end of the second optical waveguide 102b may not extend beyond the coupling region 108b in a top view of the photonic circuit 100c.

The propagation directions of photons entering the photonic circuit 100c may be as shown in arrows in FIG. 6. Photon source(s) provides photons to the first optical waveguide 102a at Port A. The source (incident) photons propagate in the direction towards the point A. At the point A source photons are directly injected into the first ring resonator 104a. The in-coupling mechanism in FIG. 6 is also termed as tangential-inject in. Since source photons have not alternative route to avoid entering the first ring resonator 104a, direct injection may achieve nearly 100% in-coupling efficiency. Among the source photons that are coupled into the first ring resonator 104a, some fraction undergoes a spontaneous physical process, such as a SFWM process, as they propagate through the first ring resonator 104a. The signal (squeezed) photons are generated. A fraction of photons enters the second ring resonator 104b through near-field coupling. The second ring resonator 104b allows more fractions of photons going through an SFWM process, which increases photon conversion rate. Further, introducing extra coupling by adding an extra ring resonator mitigates intra-resonator losses that might degrade the achievable squeezing from scattering modes. Still further, extra resonance involved in unwanted four-wave mixing processes may be suppressed when the second ring resonator 104b function as an auxiliary ring resonator. The optical paths in the two ring resonators have the same directions. If not dissipated by intrinsic losses in the ring resonators, the signal photons eventually escape from the second ring resonator 104b and are recollected by the second optical waveguide 102b through the coupling region 108b. As such evanescent coupling is often confined in a small region surrounding a point on a ring resonator that is in the shortest distance to an optical waveguide, the out-coupling mechanism in FIG. 6 is also termed as tangential-near-field-coupled out. The signal photons continue to propagate along the straight rail of the second optical waveguide 102b and exit through Port B.

The overall coupling mechanism is referred to as tangential-inject in and tangential-near-field-coupled out. Without considering the intrinsic losses, such as bending loss, absorption, and scattering, nearly all the source photons are directly injected into the first ring resonator 104a through the first optical waveguide 102a, and nearly all the generated squeezed photons are recollected by the second optical waveguide 102b. The in-coupling efficiency is nearly 100%, and the out-coupling efficiency is also nearly 100%.

Figure 7:
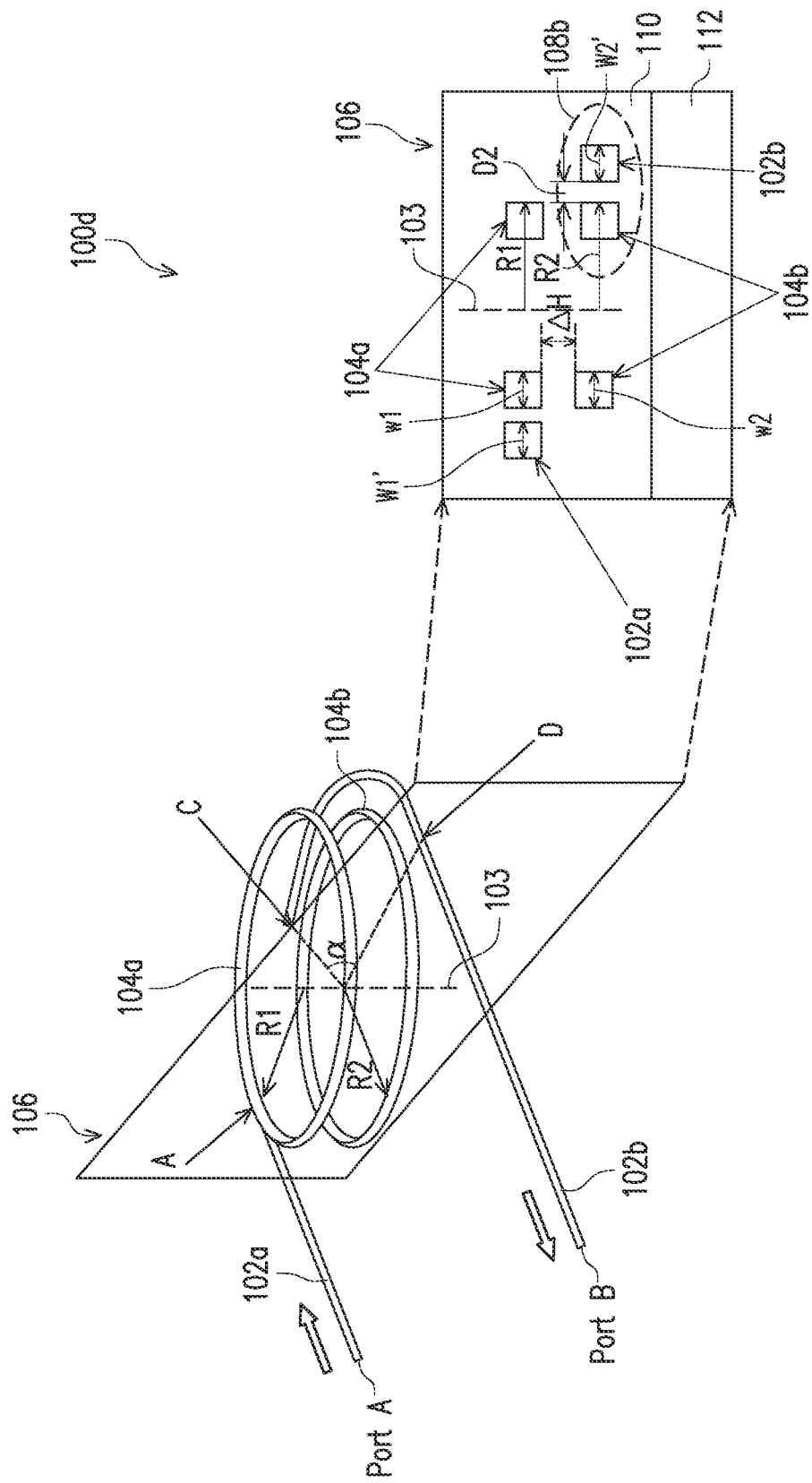

FIG. 7 illustrates a perspective view and a cross-sectional view of a photonic circuit 100d. The photonic circuit 100d includes a first ring resonator 104a, a second ring resonator 104b, a first optical waveguide 102a, and a second optical waveguide 102b. Since one skilled in the art would recognize that various aspects of the photonic circuit 100d are similar to the photonic circuit 100c illustrated in FIG. 6, and that various characteristics of the photonic circuit 100c would similarly apply to counterparts in the photonic circuit 100d, such similar aspects are not repeated below in the interest of conciseness. Yet, the optical waveguide 102b in the photonic circuit 100d have some differences from its counterpart in the photonic circuit 100c.

The second optical waveguide 102b has a first portion (coupling portion or arc portion) in a form of an arc that partially circles the second ring resonator 104b and a second portion (output portion or rail portion) in the form of a straight rail that has an output port Port B. The arc starts at a point C and connects to the straight rail at a point D. By partially circling the second ring resonator 104b, the coupling path is extended, and efficiency of collecting photons escaping from the second ring resonator 104b is increased, which mitigates intrinsic losses occurred in a ring resonator, particularly bending loss and scattering loss. The arc shape of the coupling portion may partially circle the second ring resonator 104b conformally (i.e., the arc and the ring are concentric) with a constant distance. Alternatively, the arc shape of the coupling portion may gradually taper away from the second ring resonator 104b (i.e., a smaller distance at the point C, and a larger distance at the point D). In a top view, a virtual line connecting the point A of the injection portion of the first optical waveguide 102a and the ending point D of the coupling portion of the second optical waveguide 102b may also travel through centers of the ring resonators. The virtual line may be perpendicular to the straight rails of both the first and second optical waveguides 102a and 102b in a top view.

A central angle subtended by the coupling portion of the second optical waveguide 102b (from point C to point D) is denoted as central angle $\alpha$. In various embodiments, the central angle $\alpha$ may be not less than the about 30°. This value is not trivial. If the central angle $\alpha$ is less than about 30°, the arc portion may be less efficient in recollecting squeezed photons. In the embodiment as illustrated in FIG. 7, the central angle $\alpha$ may be in a range from about 30° to about 180°. A larger central angel $\alpha$ translates to a longer path for recollecting squeezed photons and increases photon recollection rate. In one example, the central angle $\alpha$ is about 90°, such that the coupling portion partially surrounds about a quarter of the second ring resonator 104b. In one example, the central angle $\alpha$ is about 180°, such that the coupling portion partially surrounds about a half of the second ring resonator 104b.

The propagation directions of photons entering the photonic circuit 100d may be as shown in arrows in FIG. 7. The overall coupling mechanism in FIG. 7 is referred to as tangential-inject in and near-field-circumferential-coupled out. Without considering the intrinsic losses, such as bending loss, absorption, and scattering, nearly all the source photons are directly injected into the first ring resonator 104a through the first optical waveguide 102a, and nearly all the generated squeezed photons are recollected by the second optical waveguide 102b. The in-coupling efficiency is nearly 100%, and the out-coupling efficiency is also nearly 100%.

Figure 8:
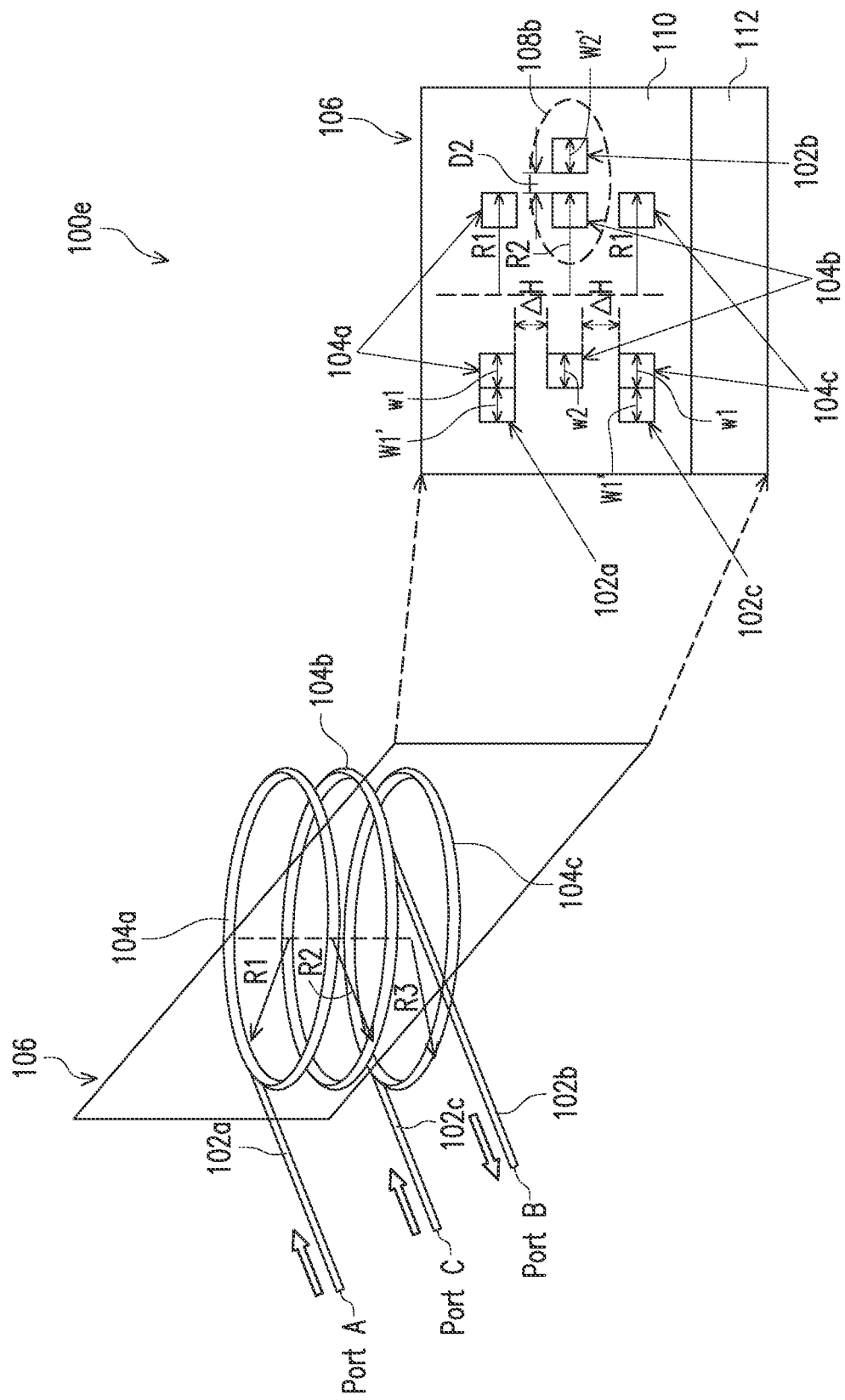

FIG. 8 illustrates a perspective view and a cross-sectional view of a photonic circuit 100e. The photonic circuit 100e includes a first ring resonator 104a, a second ring resonator 104b, a first optical waveguide 102a, and a second optical waveguide 102b. Since one skilled in the art would recognize that various aspects of the photonic circuit 100e are similar to the photonic circuit 100c illustrated in FIG. 6, and that various characteristics of the photonic circuit 100c would similarly apply to counterparts in the photonic circuit 100e, such similar aspects are not repeated below in the interest of conciseness. Different from the photonic circuit 100c, the photonic circuit 100e further includes a third optical waveguide 102c and a third ring resonator 104c. The extra optical waveguide and the extra ring resonator provide extra input port allowing more optical power to be pumped in the photonic circuit 100e and extra coupling among the ring resonators to further increase squeeze level. The third optical waveguide 102c and the third ring resonator 104c are positioned in the same horizontal plane. The third optical waveguide 102c and the third ring resonator 104c may be identical to the first optical waveguide 102a and the first ring resonator 104, respectively. The third optical waveguide 102c tangentially directly injects photons into the third ring resonator 104c. The second ring resonator 104b is located between the first ring resonator 104a and the third ring resonator 104c, such as with the same vertical distance $\Delta H$. The propagation directions of photons entering the photonic circuit 100e may be as shown in arrows in FIG. 8.

Figure 9:
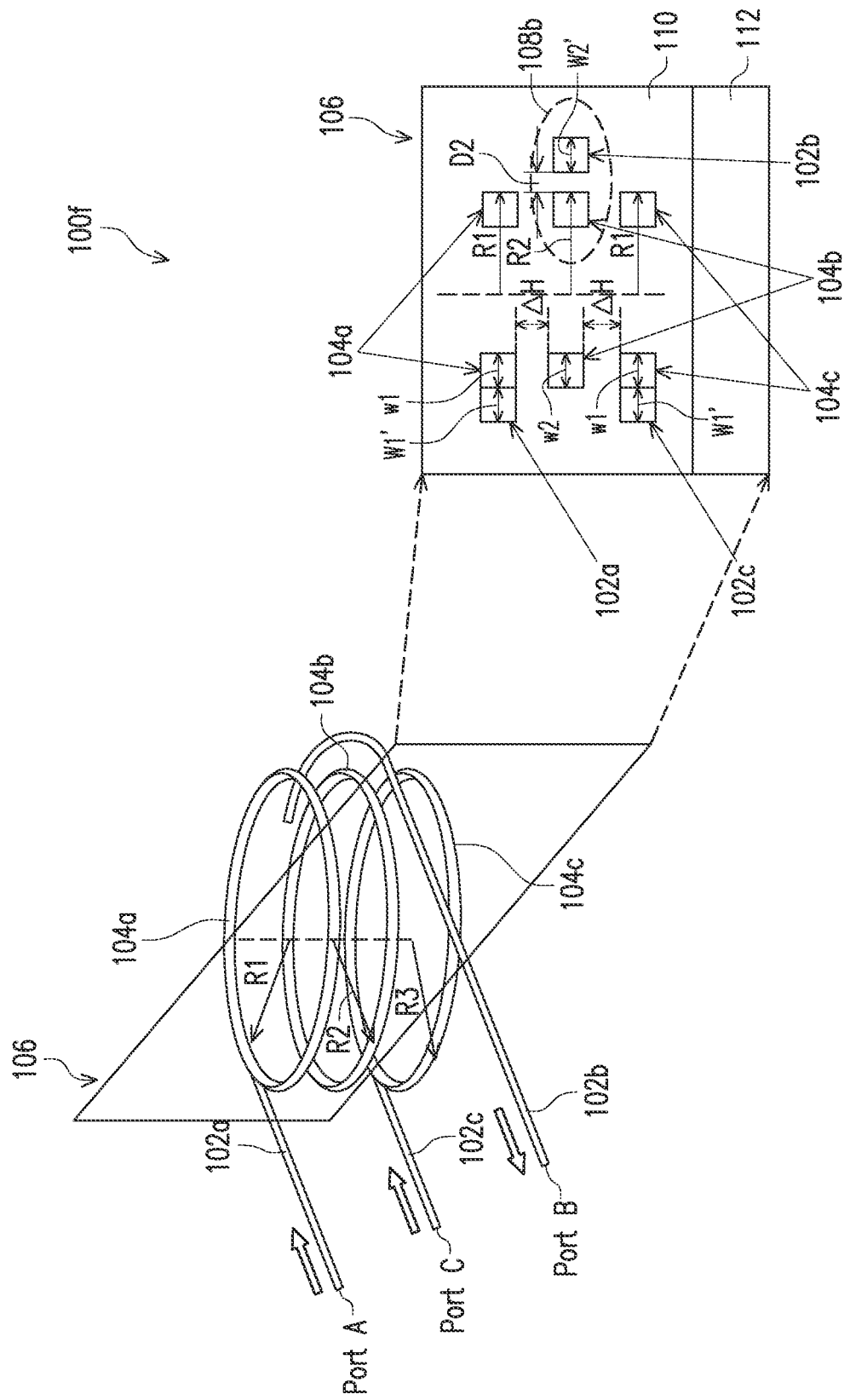

FIG. 9 illustrates a perspective view and a cross-sectional view of a photonic circuit 100f. The photonic circuit 100f includes a first ring resonator 104a, a second ring resonator 104b, a first optical waveguide 102a, and a second optical waveguide 102b. Since one skilled in the art would recognize that various aspects of the photonic circuit 100f are similar to the photonic circuit 100d illustrated in FIG. 7, and that various characteristics of the photonic circuit 100d would similarly apply to counterparts in the photonic circuit 100f, such similar aspects are not repeated below in the interest of conciseness. Different from the photonic circuit 100d, the photonic circuit 100f further includes a third optical waveguide 102c and a third ring resonator 104c. The extra optical waveguide and the extra ring resonator provide extra input port allowing more optical power to be pumped in the photonic circuit 100f and extra coupling among the ring resonators to further increase squeeze level. The third optical waveguide 102c and the third ring resonator 104c are positioned in the same horizontal plane. The third optical waveguide 102c and the third ring resonator 104c may be identical to the first optical waveguide 102a and the first ring resonator 104a, respectively. The third optical waveguide 102c tangentially directly injects photons into the third ring resonator 104c. The second ring resonator 104b is located between the first ring resonator 104a and the third ring resonator 104c, such as with the same vertical distance $\Delta H$. The propagation directions of photons entering the photonic circuit 100f may be as shown in arrows in FIG. 9.

Figure 10:
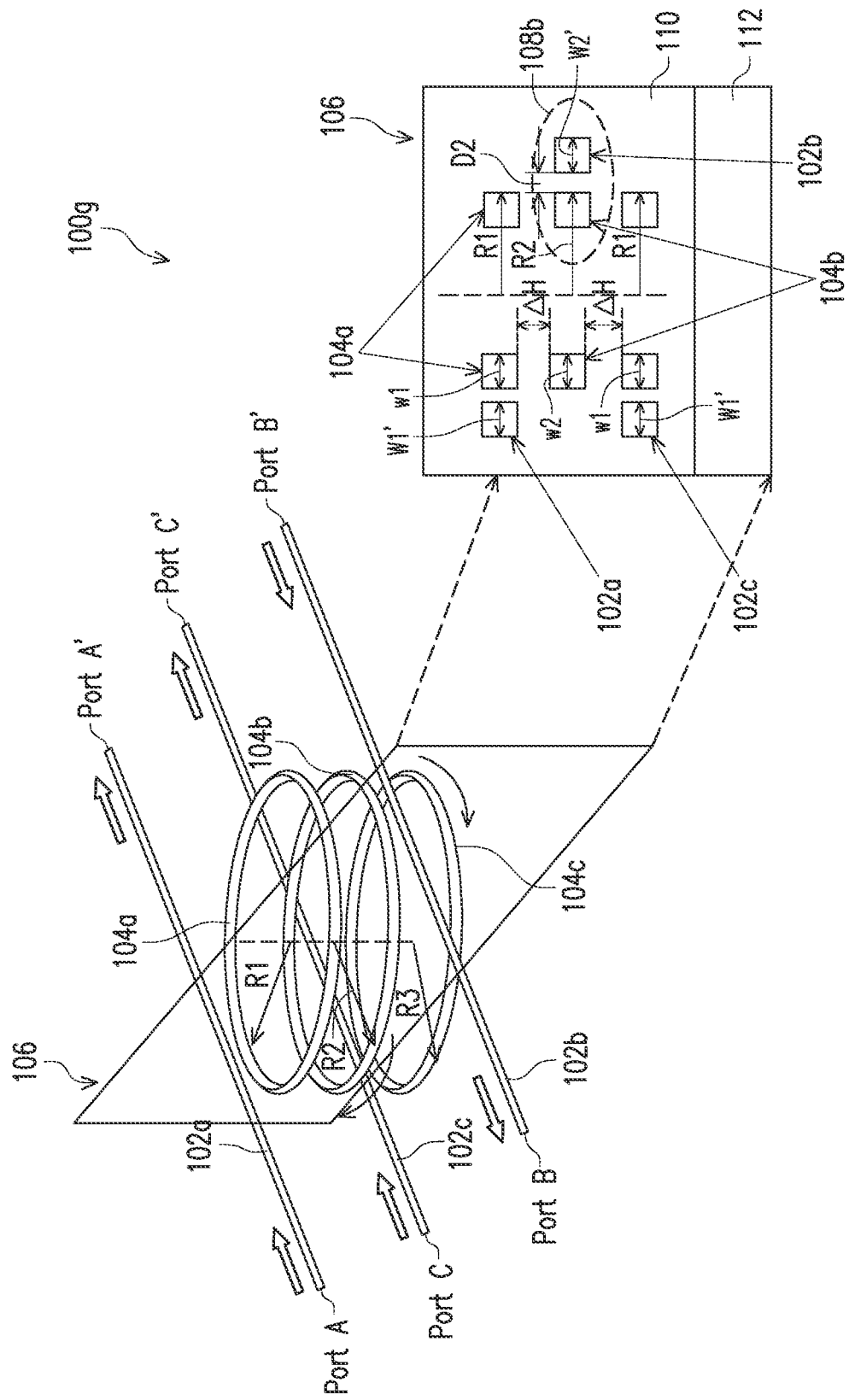

FIG. 10 illustrates a perspective view and a cross-sectional view of a photonic circuit 100g. The photonic circuit 100g includes a first ring resonator 104a, a second ring resonator 104b, a first optical waveguide 102a, and a second optical waveguide 102b. Since one skilled in the art would recognize that various aspects of the photonic circuit 100g are similar to the photonic circuit 100a illustrated in FIG. 4, and that various characteristics of the photonic circuit 100a would similarly apply to counterparts in the photonic circuit 100g, such similar aspects are not repeated below in the interest of conciseness. Different from the photonic circuit 100a, the photonic circuit 100g further includes a third optical waveguide 102c, and a third ring resonator 104c. The extra optical waveguide and the extra ring resonator provide extra input port allowing more optical power to be pumped in the photonic circuit 100g and extra coupling among the ring resonators to further increase squeeze level. The third optical waveguide 102c and the third ring resonator 104c are positioned in the same horizontal plane. The third optical waveguide 102c and the third ring resonator 104c may be identical to the first optical waveguide 102a and the first ring resonator 104a, respectively. The third optical waveguide 102c couples to the third ring resonator 104c though near-field coupling. The second ring resonator 104b is located between the first ring resonator 104a and the third ring resonator 104c, such as with the same vertical distance ΔH. The propagation directions of photons entering the photonic circuit 100g may be as shown in arrows in FIG. 10.

Figure 11:
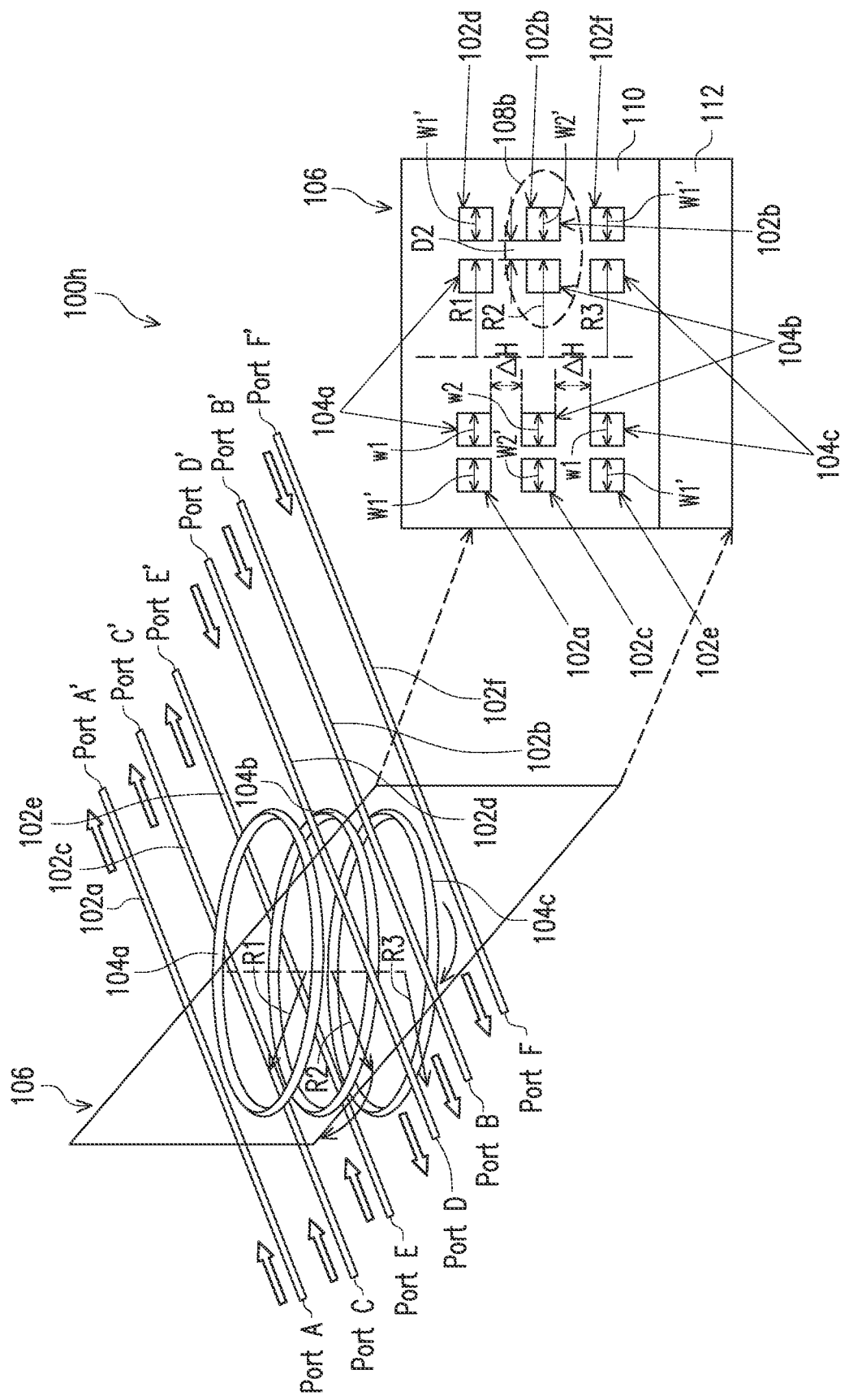

FIG. 11 illustrates a perspective view and a cross-sectional view of a photonic circuit 100h. The photonic circuit 100h includes a first ring resonator 104a, a second ring resonator 104b, a first optical waveguide 102a, a second optical waveguide 102b, a third optical waveguide 102c, and a fourth optical waveguide 102d. Since one skilled in the art would recognize that various aspects of the photonic circuit 100h are similar to the photonic circuit 100b illustrated in FIG. 5, and that various characteristics of the photonic circuit 100b would similarly apply to counterparts in the photonic circuit 100h, such similar aspects are not repeated below in the interest of conciseness. Different from the photonic circuit 100b, the photonic circuit 100h further includes a third ring resonator 104c, a fifth optical waveguide 102e, and a sixth optical waveguide 102f. The extra optical waveguides and the extra ring resonator provide extra input ports allowing more optical power to be pumped in the photonic circuit 100h and extra coupling among the ring resonators to further increase squeeze level. The third ring resonator 104c, the fifth optical waveguide 102e, and the sixth optical waveguide 102f are positioned in the same horizontal plane. The third ring resonator 104c, the fifth optical waveguide 102e, and the sixth optical waveguide 102f may be identical to the first ring resonator 104a, the first optical waveguide 102a, and the fourth optical waveguide 102d, respectively. The fifth optical waveguide 102e and the sixth optical waveguide 102f each couple to the third ring resonator 104c though near-field coupling. The second ring resonator 104b is located between the first ring resonator 104a and the third ring resonator 104c, such as with the same vertical distance ΔH. The propagation directions of photons entering the photonic circuit 100h may be as shown in arrows in FIG. 11.

Although not intended to be limiting, one or more embodiments of the present disclosure provide many benefits to photonic quantum technologies and/or optical communication systems. In photonic quantum technologies field, the exemplary photonic circuitries having multiple stacked optical resonators provide squeezed light source with high optical power efficiency and high spectral purity. In optical communication system field, the exemplary photonic circuitries having multiple stacked optical resonators provide wavelength filtering with high quality factors.

In an example aspect, the present disclosure is directed to an optical device. The optical device includes a first ring resonator positioned in a first plane, a first optical waveguide positioned in the first plane, the first optical waveguide configured to provide photons to the first ring resonator, a second ring resonator positioned in a second plane, the second plane being below the first plane, and a second optical waveguide positioned in the second plane, the second optical waveguide configured to receive photons escaping from the second ring resonator. In some embodiments, in a top view the first and second ring resonators are concentric. In some embodiments, the first ring resonator has a first radius, and the second ring resonator has a second radius that equals the first radius. In some embodiments, the first ring resonator has a first radius, and the second ring resonator has a second radius that is different from the first radius. In some embodiments, the first optical waveguide is coupled to the first ring resonator through near-field coupling, and the second optical waveguide is coupled to the second ring resonator through near-field coupling. In some embodiments, the first optical waveguide includes a straight rail tangential to and in contact with a circumference of the first ring resonator. In some embodiments, the second optical waveguide includes an arc partially surrounding the second ring resonator. In some embodiments, the optical device further includes a third optical waveguide positioned in the first plane, the first and third optical waveguides sandwiching the first ring resonator, and a fourth optical waveguide positioned in the second plane, the second and fourth optical waveguides sandwiching the second ring resonator. In some embodiments, the optical device further includes a third ring resonator positioned in a third plane, the first and third planes sandwiching the second plane, and a third optical waveguide position in the third plane, the third optical waveguide being configured to provide photons to the third ring resonator. In some embodiments, the first and second ring resonators are disposed over a semiconductor substrate, and each of the first and second ring resonators includes an optical medium providing a third-order nonlinear optical susceptibility.

In another example aspect, the present disclosure is directed to an optical device. The optical device includes a first ring resonator with a first radius, a second ring resonator with a second radius, the second ring resonator being stacked under the first ring resonator, a first optical waveguide directly injecting photons into the first ring resonator, and a second optical waveguide accepting photons escaping from the second ring resonator. The first and second ring resonators are positioned between the first and second optical waveguides in a top view, and the first and second ring resonators and the first and second optical waveguides are disposed above a semiconductor substrate. In some embodiments, the second optical waveguide is coupled to the second ring resonator through near-field coupling. In some embodiments, the near-field coupling is nearly-field circumferential coupling. In some embodiments, the first radius is larger than the second radius. In some embodiments, the first optical waveguide includes a straight rail tangential to a circumference of the first ring resonator. In some embodiments, the optical device further includes a third ring resonator with the first radius, the third ring resonator being stacked under the second ring resonator, and a third optical waveguide directly injecting photons into the third ring resonator. In some embodiments, optical paths in the first and second ring resonators have a same direction.

In yet another example aspect, the present disclosure is directed to a method. The method includes sending a source light beam into a first optical waveguide, receiving the source light beam into a first ring resonator, a fraction of the source light beam being converted into a signal light beam via a spontaneous four-wave mixing process occurred in the first ring resonator, coupling the signal light beam into a second ring resonator through near-field coupling between the first ring resonator and the second ring resonator, the second ring resonator being stacked under the first ring resonator, and coupling the signal light beam into a second optical waveguide through near-field coupling between the second ring resonator and the second optical waveguide. In some embodiments, a portion of the second optical waveguide partially surrounds the second ring resonator. In some embodiments, the second ring resonator is configured to suppress auxiliary resonance within the first ring resonator.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An optical device, comprising:
   a first ring resonator positioned in a first plane;
   a first optical waveguide positioned in the first plane, wherein a terminal of the first optical waveguide merges with the first ring resonator such that the first optical waveguide is configured to directly provide photons to the first ring resonator;
   a second ring resonator positioned in a second plane, wherein the second plane is below the first plane; and
   a second optical waveguide positioned in the second plane, wherein the second optical waveguide remains spaced apart from the second ring resonator such that the second optical waveguide is configured to receive photons escaping from the second ring resonator by coupling.

2. The optical device of claim 1, wherein in a top view the first and second ring resonators are concentric.

3. The optical device of claim 1, wherein the first ring resonator has a first radius, and the second ring resonator has a second radius that equals the first radius.

4. The optical device of claim 1, wherein the first ring resonator has a first radius, and the second ring resonator has a second radius that is different from the first radius.

5. The optical device of claim 1, wherein the first optical waveguide is coupled to the first ring resonator through near-field coupling, and the second optical waveguide is coupled to the second ring resonator through near-field coupling.

6. The optical device of claim 1, wherein the first optical waveguide includes a straight rail tangential to and in contact with a circumference of the first ring resonator.

7. The optical device of claim 1, wherein the second optical waveguide includes an arc partially surrounding the second ring resonator.

8. The optical device of claim 1, further comprising:
   a third optical waveguide positioned in the first plane, wherein the first and third optical waveguides sandwich the first ring resonator; and
   a fourth optical waveguide positioned in the second plane, wherein the second and fourth optical waveguides sandwich the second ring resonator.

9. The optical device of claim 1, further comprising:
   a third ring resonator positioned in a third plane, wherein the first and third planes sandwich the second plane; and
   a third optical waveguide position in the third plane, wherein the third optical waveguide is configured to provide photons to the third ring resonator.

10. The optical device of claim 1, wherein the first and second ring resonators are disposed over a semiconductor substrate, and each of the first and second ring resonators includes an optical medium providing a third-order nonlinear optical susceptibility.

11. An optical device, comprising:
    a first ring resonator with a first radius;
    a second ring resonator with a second radius, wherein the second ring resonator is stacked under the first ring resonator;
    a first optical waveguide merged with the first ring resonator for directly injecting photons into the first ring resonator; and
    a second optical waveguide spaced apart from the second ring resonator for accepting photons escaping from the second ring resonator by coupling, wherein the first and second ring resonators are positioned between the first and second optical waveguides in a top view, and wherein the first and second ring resonators and the first and second optical waveguides are disposed above a semiconductor substrate.

12. The optical device of claim 11, the second optical waveguide is coupled to the second ring resonator through near-field coupling.

13. The optical device of claim 12, wherein the near-field coupling is nearly-field circumferential coupling.

14. The optical device of claim 11, wherein the first radius is larger than the second radius.

15. The optical device of claim 11, wherein the first optical waveguide includes a straight rail tangential to a circumference of the first ring resonator.

16. The optical device of claim 11, further comprising:
    a third ring resonator with the first radius, wherein the third ring resonator is stacked under the second ring resonator; and
    a third optical waveguide directly injecting photons into the third ring resonator.

17. The optical device of claim 11, wherein optical paths in the first and second ring resonators have a same direction.

18. An optical device, comprising:
    a first ring resonator embedded in a dielectric layer with a center of the first ring resonator positioned in the dielectric layer;
    a first optical waveguide, wherein the first optical waveguide has a terminal merged with the first ring resonator such that the first optical waveguide is configured to directly provide photons to the first ring resonator;
    a second ring resonator embedded in the dielectric layer with a center of the second ring resonator positioned in the dielectric layer, wherein the second ring resonator is stacked under the first ring resonator; and
    a second optical waveguide coupled to and spaced apart from the second ring resonator, wherein the second optical waveguide is configured to receive photons escaping from the second ring resonator by coupling.

19. The method of claim 18, wherein a portion of the second optical waveguide partially surrounds the second ring resonator.

20. The method of claim 18, wherein the second ring resonator is configured to suppress auxiliary resonance within the first ring resonator.

* * * * *